US010200747B2

(12) United States Patent
Hua

(10) Patent No.: US 10,200,747 B2
(45) Date of Patent: Feb. 5, 2019

(54) COMPUTER NETWORK PROVIDING REDUNDANT DATA TRAFFIC CONTROL FEATURES AND RELATED METHODS

(71) Applicant: UNIVERSITY OF CENTRAL FLORIDA RESEARCH FOUNDATION, INC., Orlando, FL (US)

(72) Inventor: Kien Hua, Longwood, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 15/323,141

(22) PCT Filed: Jul. 24, 2015

(86) PCT No.: PCT/US2015/041897
§ 371 (c)(1),
(2) Date: Dec. 30, 2016

(87) PCT Pub. No.: WO2016/014893
PCT Pub. Date: Jan. 28, 2016

(65) Prior Publication Data
US 2017/0251246 A1   Aug. 31, 2017

Related U.S. Application Data

(60) Provisional application No. 62/028,529, filed on Jul. 24, 2014.

(51) Int. Cl.
*H04N 7/16* (2011.01)
*H04N 21/44* (2011.01)
(Continued)

(52) U.S. Cl.
CPC ... *H04N 21/44004* (2013.01); *H04L 65/4076* (2013.01); *H04L 65/4084* (2013.01);
(Continued)

(58) Field of Classification Search
CPC combination set(s) only.
See application file for complete search history.

(56) References Cited

U.S. PATENT DOCUMENTS

2006/0288363 A1   12/2006   Kunkel et al.
2009/0219437 A1    9/2009   Baugher et al.
2014/0053212 A1*   2/2014   Shoykher .............. G06F 3/017
                                                 725/59

OTHER PUBLICATIONS

Nichols et al. "Design and Implementation of Intelligent Mesh Nodes for Wireless Video Stream Sharing" ICIMCS '11 Proceedings of the Third International Conference on Internet Multimedia Computing and Service pp. 4.
(Continued)

*Primary Examiner* — Mulugeta Mengesha
(74) *Attorney, Agent, or Firm* — Allen, Dyer, Doppelt + Gilchrist, PA

(57) ABSTRACT

A computing device may include a memory and a processor cooperating therewith to receive a plurality of data streams from at least one data source to be relayed to different destinations on demand, where each data stream has a respective content identifier associated therewith. The processor may further determine when a first one of the data streams for a first destination shares identical data with a second one of the data streams for a second destination based upon the respective content identifiers associated therewith, and suspend relaying the second data stream to the second destination, and begin relaying the first data stream to the second destination, based upon the determi-
(Continued)

nation that the first and second data streams share identical data based upon the respective content identifiers associated therewith.

17 Claims, 10 Drawing Sheets

(51) Int. Cl.
   | | |
   |---|---|
   | *H04N 21/433* | (2011.01) |
   | *H04N 21/63* | (2011.01) |
   | *H04N 21/6405* | (2011.01) |
   | *H04N 21/845* | (2011.01) |
   | *H04N 21/435* | (2011.01) |
   | *H04N 21/472* | (2011.01) |
   | *H04N 21/84* | (2011.01) |
   | *H04L 29/06* | (2006.01) |
   | *H04N 21/231* | (2011.01) |
   | *H04N 21/266* | (2011.01) |

(52) U.S. Cl.
   CPC ......... *H04L 65/605* (2013.01); *H04N 21/433* (2013.01); *H04N 21/435* (2013.01); *H04N 21/4331* (2013.01); *H04N 21/47202* (2013.01); *H04N 21/632* (2013.01); *H04N 21/6405* (2013.01); *H04N 21/84* (2013.01); *H04N 21/8456* (2013.01); *H04L 65/607* (2013.01); *H04N 21/23106* (2013.01); *H04N 21/26616* (2013.01)

(56) References Cited

OTHER PUBLICATIONS

Hua et al. "A Dynamic Stream Merging Technique for Video-on-Demand Services over Wireless Mesh Access Networks" 2010 7th Annual IEEE Communications Society Conference onSensor Mesh and Ad Hoc Communications and Networks (SECON), Jun. 21-25, 2010; pp. 9.

Nichols et al. "Robust wireless sharing of Internet video streams" http://link.springer.com/article/10.1007%2Fs00530-012-0295-8: Oct. 11, 2012: pp. 12.

Fei Xie "A Robust Wireless Mesh Access Environment for Mobile Video Users" 2010 [retrieved Sep. 18, 2015]. Retrieved from the Internet: <URL: http://etd.fcla.edu/CF/CFE0003241/Xie_Fei_201008_PhD.pdf> pp. 1-119.

Ye, J. "Scalability Study of Wireless Mesh Networks with Dynamic Stream Capability"; Publication [online]. Jun. 3, 2011 [retrieved Sep. 18, 2015]. Retrieved from the Internet: <URL: http://www.eecs.ucf.edu/-jye/pdf/MCSS.ye.pdf> pp. 324-330.

Hua et al. "Redundancy Control through Traffic Deduplication" 2015 IEEE Conference on Computer Communications (INFOCOM), Date of Conference: Apr. 26-May 1, 2015; pp. 9.

Beirami et al. "Universal Compression of a Mixture of Parametric Sources with Side Information:" https://arxiv.org/abs/1411.7607 (Submitted on Nov. 27, 2014) pp. 14.

Sardari et al. "Content-Aware Network Data Compression Using Joint Memorization and Clustering" 2013 Proceedings IEEE INFOCOM: http://www.mit.edu/~beirami/papers/INFOCOM13-cluster.pdf; pp. 5.

Sardari et al. "Memory-Assisted Universal Compression of Network Flows" 2012 Proceedings IEEE INFOCOM: http://www.mit.edu/~beirami/papers/INFOCOM12-NetComp.pdf; pp. 5.

Beirami et al. "Wireless Network Compression via Memory-Enabled Overhearing Helpers" IEEE Transactions on Wireless Communications, vol. 15, No. 1, Jan. 2016; pp. 15.

Beirami et al. Packet-Level Network Compression: Realization and Scaling of the Network-Wide Benefits: IEEE/ACM Transactions on Networking, vol. 24, No. 3, Jun. 2016; pp. 17.

\* cited by examiner

COMPUTER NETWORK PROVIDING REDUNDANT DATA TRAFFIC CONTROL FEATURES AND RELATED METHODS

TECHNICAL FIELD

The present disclosure generally relates to computer networks and, more particularly, to data traffic management for computer networks.

BACKGROUND

With rapid advances in networking technology, video data has become an inseparable part of many applications. In particular, video on demand (VoD) is a core technology for important applications such as digital libraries, distance learning, corporate training, public information systems, electronic commerce, and entertainment, for example. A typical VoD service allows remote users to playback a video from a large collection of videos stored on one or more servers. In response to a service request, a video server delivers the video to the user in an isochronous video stream.

The growing popularity of wireless networks on the one hand, combined with the need for ubiquitous access to VoD resources on the other hand, presents challenges with respect to communicating the ever-increasing amount of data available from video servers to a growing user base.

For example, problems may arise when there are sudden instances of high demand for data, such as videos. For instance, the death of the popular singer Michael Jackson caused a period of great interest in his videos. When an event like this arises, the substantial increase in demand for the related videos may significantly impact normal access to other regular videos and data.

Various approaches have been used for disseminating large amounts of data, such as video streams, to a large number of users. One such approach is multicast technology, which allows many users to share a popular server stream. However, this approach generally requires all users to watch the same data at an appointed time, and therefore cannot be started at a user's convenience "on demand".

SUMMARY

A computing device may include a memory and a processor cooperating therewith to receive a plurality of data streams from at least one data source to be relayed to different destinations on demand, where each data stream has a respective content identifier associated therewith. The processor may further determine when a first one of the data streams for a first destination shares identical data with a second one of the data streams for a second destination based upon the respective content identifiers associated therewith, and suspend relaying the second data stream to the second destination, and begin relaying the first data stream to the second destination, based upon the determination that the first and second data streams share identical data based upon the respective content identifiers associated therewith.

More particularly, the processor may cooperate with the memory to store the first data stream in the memory, and begin relaying the first data stream from the memory to the second destination from a location in the second data stream where relaying was suspended. By way of example, the memory may comprise a first-in, first-out (FIFO) memory. Also by way of example, the first and second data streams may comprise video data streams.

Additionally, the first and second data streams may each have a respective downstream node identifier associated therewith. Furthermore, the processor may also determine when the first and second data streams have matching downstream node identifiers, and begin relaying the first data stream from the memory to the second destination further based upon the matching downstream node identifiers. The processor may be further configured to determine when relaying of the first data stream to the first destination is terminated, and discontinue relaying the first data stream to the second destination and resuming relaying the second data stream to the second destination based upon determining that relaying of the first data stream has been terminated.

The content identifiers may be encoded in respective data streams. Furthermore, data streams having a same content identifier may have identical content, and the processor may be configured to determine when the first and second data streams share identical data based upon the first and second data streams having the same content identifier.

A related computer network is also provided which may include a plurality of computing devices such as the one described briefly above. A related method for relaying a plurality of data streams from at least one data source to a plurality different destinations on demand via a computing network including a plurality of computing devices, such as the one described briefly above, is also provided.

BRIEF DESCRIPTION OF THE DRAWINGS

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete.

DETAILED DESCRIPTION

Generally speaking, the present disclosure provides a robust network data access environment that may be used to provide desired data traffic management, even when there are sudden instances of unusually high demand for data. In particular, the present approach uses a dynamic stream merging (DSM) technique in which identical data streams may be merged or shared at various nodes or routers within a communications network to conserve network resources (e.g., processing and bandwidth resources), and yet distributed to different users at different times or "on demand". More particularly, the approach set forth herein may use content identifiers to help determine if two video streams are identical and share the same data, despite originally being stored on different servers and with different server designations. Similar to a URL, a content identifier may be encoded in video streams, etc., to facilitate duplication detection.

Figure 1:
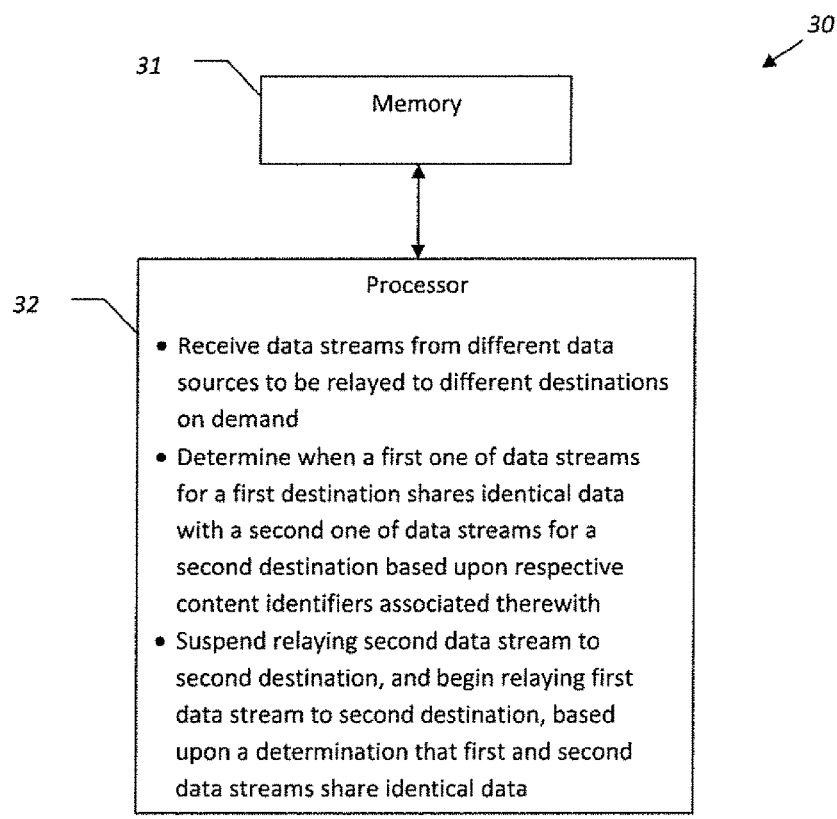
FIG. 1 is a schematic block diagram of a computing device which may be used for performing dynamic stream merging operations in accordance with an example aspect.

Referring initially to FIG. 1, an example network computing device 30, which may be an Internet or other computer network node or server, for example, illustratively includes a memory 31 and a processor 32 coupled to the memory. By way of example, the processor 32 may be implemented using a microprocessor, and the memory may comprise a non-transitory computer-readable medium having computer-executable instructions for causing the processor to perform the operations noted herein.

More particularly, the processor 32 may be configured to receive a plurality of data streams from different data sources to be relayed to different destinations on demand, with each data stream having a respective content identifier associated therewith. The processor 32 may determine when a first one of the data streams for a first destination shares identical data with a second one of the data streams for a second destination based upon the respective content identifiers associated therewith. The processor 32 may accordingly suspend relaying the second data stream to the second destination, and begin relaying the first data stream to the second destination, based upon a determination that the first and second data streams share identical data based upon the respective content identifiers associated therewith.

By way of example, content IDs may be assigned by data content providers for their own respective data files. For example, a large video provider such as Amazon or YouTube may have multiple copies of the same video file stored on different servers for redundancy or efficiency in serving users in or from multiple locations, and such providers may use their own respective content ID schemes for such files.

Another approach is that network providers, such as cellular or telecommunications network providers, may assign content IDs to data files, or allocate ID ranges to respective content providers using the network to stream their files to users. Similarly, a designated content ID registration service may provide content IDs for data files registered therewith, similar to domain name registration, for example. In this way, identical files being streamed through a network from different content providers (e.g., Netflix, Hulu, etc.) may be merged or shared for different users, without the users ever knowing. For example, if a first user is streaming a movie from Netflix over a cable operator's network and a second user is streaming the same movie from Hulu also over the cable operator's network, the cable operator's server may suspend the Hulu stream and instead serve the Netflix stream to the second user, even though the second user is not a Netflix subscriber.

In one example embodiment, the content IDs are unique across content providers. That is, a provider may assign the same content ID to multiple ones of their video files. However, the sets of content IDs allocated to the video providers may be mutually exclusive, i.e., no two content providers share the same content ID. Some providers may knowingly share a content ID for the same video (e.g., a popular movie) they provide. Yet, in an example embodiment, only video files with identical content carry the same content ID.

Figure 2:
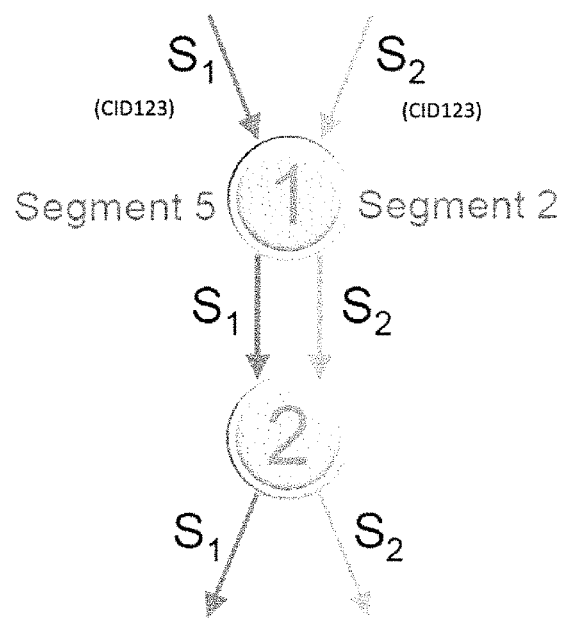
FIGS. 2-3 are a series of schematic block diagram illustrating a dynamic stream merging approach in accordance with an example aspect.
Figure 3:
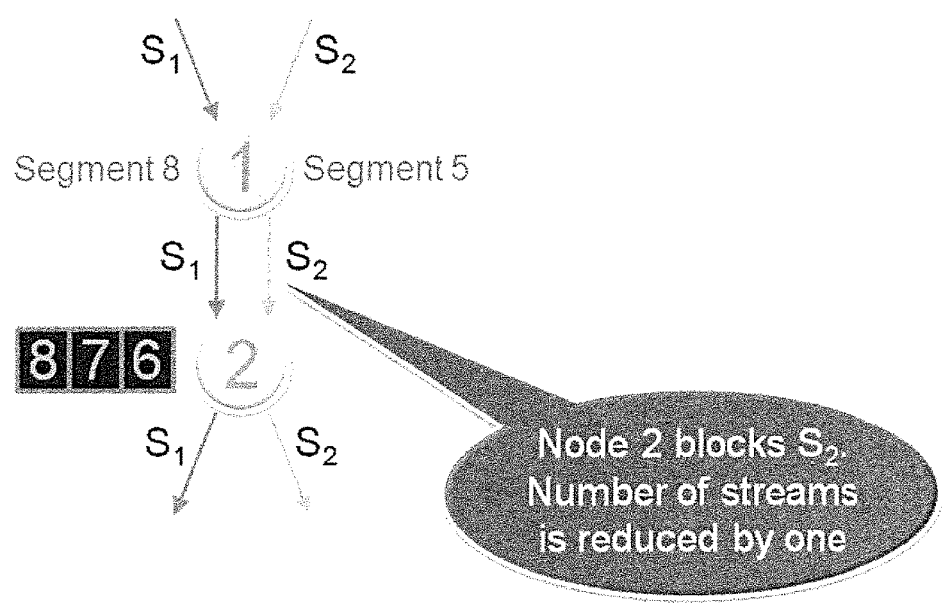

By way of contrast, the Dynamic Stream Merging techniques set forth herein are not to be confused with other existing techniques such as CDN (content distribution networks), and P2P (Peer-to-Peer) streaming. More particularly, the present approach provides for a smart network overlay, in which duplicate traffic may be reduced or eliminated. Referring more particularly to FIGS. 2-3, the Internet consumes about 5% of the energy usage world-wide. Moreover, it is estimated that about 90% of Internet traffic is video and is mostly "redundant." As an example, approximately 10% of the most popular videos account for 90% of total views on YouTube. As a result, redundant data is repeatedly transmitted over the Internet. The present approach provides a traffic de-duplication technique for more efficient network communications between video sources (video servers, or proxy servers in a CDN) and clients. It should be noted that DSM can also be applied directly to a physical network (instead of on an overlay network).

Figure 4:
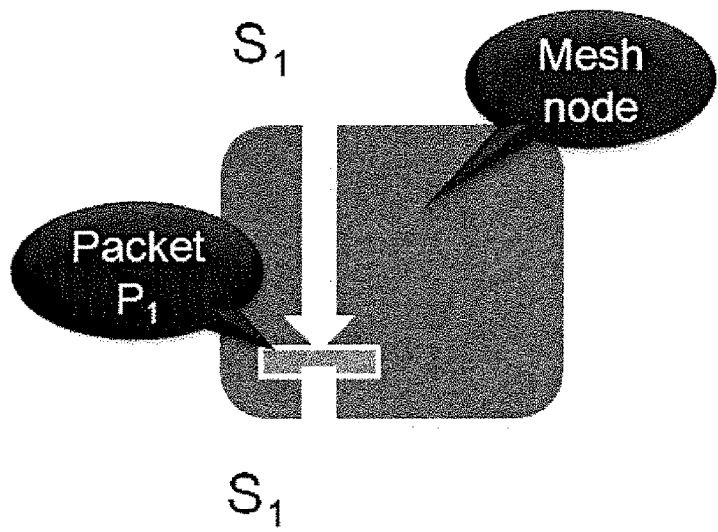
FIGS. 4-9 are a series of schematic block diagrams illustrating a packet routing approach that may be used with the dynamic stream merging approach in an example embodiment.
Figure 5:
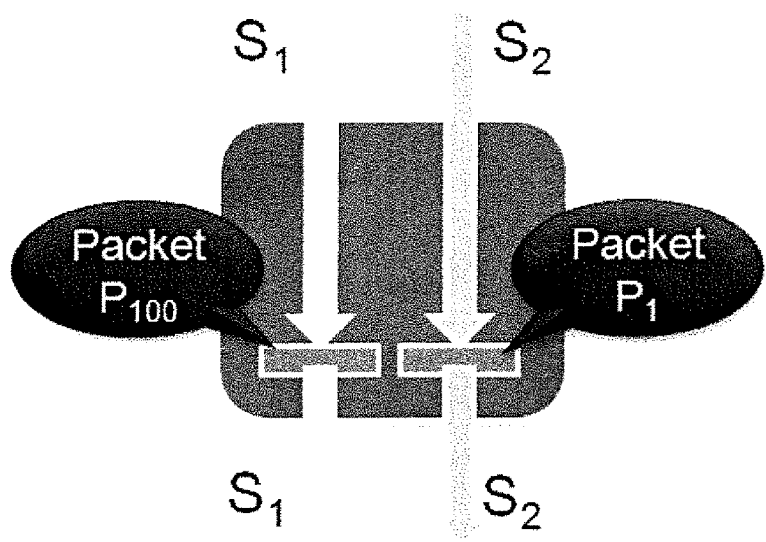

In accordance with one example implementation, the device 30 may be deployed as part of a smart overlay network approach, i.e., as a "smart" router that is deployed over the Internet backbone. In the examples of FIGS. 2-4, the node N2 may be implemented as a smart router, for example. Each video stream $S_1$, $S_2$ is transmitted from a video source to a client over a series of smart routers or nodes N1, N2. The TCP packets transmitted between any two smart routers N1, N2 may still be transmitted according to IP protocols, as in other overlay network designs. When a smart router recognizes that two video streams passing through are actually for the same video, it reuses the data packets from the older stream for the younger stream at some time later, and requests the upstream smart router to stop transmitting this younger stream to save network resource. It should be noted that, in addition to the Internet backbone, the smart routers may be deployed anywhere in the network. In general, it is most advantageous to place them at locations with high traffic in order to catch and leverage duplicate streams. The overlay design is a practical deployment strategy since we cannot replace all the routers in the Internet at once. The overlay network can grow incrementally as old routers are replaced in with smart routers.

In the illustrated example, node N1 notices that both streams $S_1$ and $S_2$ have the same video or content ID ("CID123" in this example) as well as the same node ID for the next hop (i.e., the ID for node N2). Accordingly, node N1 notifies node N2 of its intention to merge the two streams starting at segment 5. In response to the notification, the node N2 starts to save segments from $S_1$ in a memory, such as a FIFO buffer, for example. After forwarding segment 4 from stream $S_2$, the node N2 continues to forward the subsequent segments (i.e., segments 5, 6, 7, etc.) by reusing these segments from stream $S_1$ stored in the buffer, and the stream $S_2$ is blocked or discontinued. As such, in this example, $S_2$ is merged with $S_1$ ($S_1 \rightarrow S_2$). More generally, there may be $S_1 \rightarrow S_2 \rightarrow S_3 \rightarrow \ldots \rightarrow S_k$ to save k-1 streams.

This opportunistic traffic de-duplication approach at each smart router dynamically merges independent streams on the overlay into a streaming tree. This is not the same as a multicast tree. All the clients of a multicast tree are at the same play point in the video stream. In contrast, the clients of a streaming tree in accordance with the present approach may be at their own respective play points in the same video stream. This new capability enables exploitation of the efficiency of multicast for video on demand.

Moreover, it should also be noted that the proposed overlay is different from a P2P streaming technique. A peer in a P2P design such as BitTorrent receives its data from different peers for a given video. The smart router of the present approach receives a given video stream from a designated smart router according to the routing algorithm. In other words, the present approach is a routing, not a file sharing, technique. Moreover, P2P streaming is not a de-duplication technique and does not reduce network traffic, as is the case with the present approach.

Furthermore, the differences between the present approach and a CDN should also be noted. That is, the present approach is a network communication, not a caching, technique. The different streams are merged in the router fabric at line rate. When a streaming tree session terminates, the video data need not be cached in the smart routers. In contrast, a video is cached in a CDN for a very long duration according to some cache replacement policy (e.g., LRU). Furthermore, using proxy servers does not save bandwidth between these servers and their users (i.e., no traffic de-duplication). However, this may be achieved in accordance with the present approach using smart routers in regional networks, and/or to provide savings in the Internet backbone.

Figure 6:
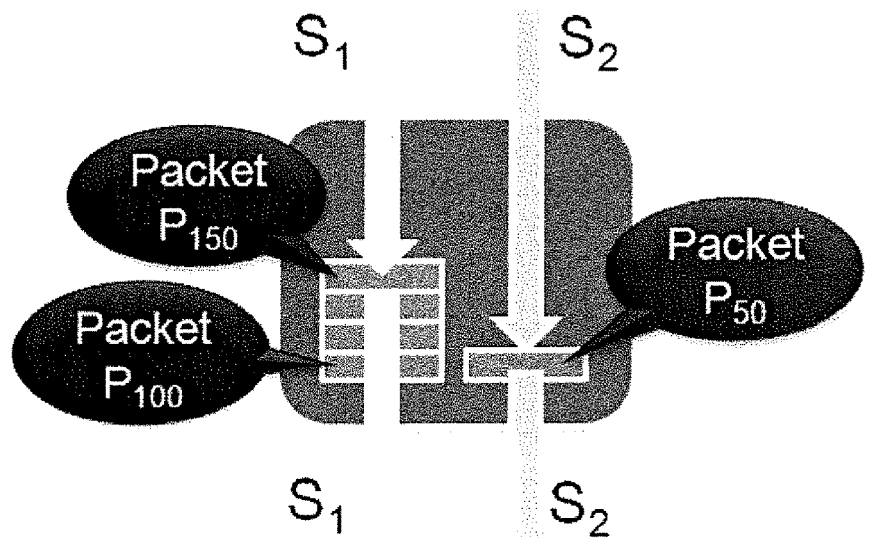
Figure 7:
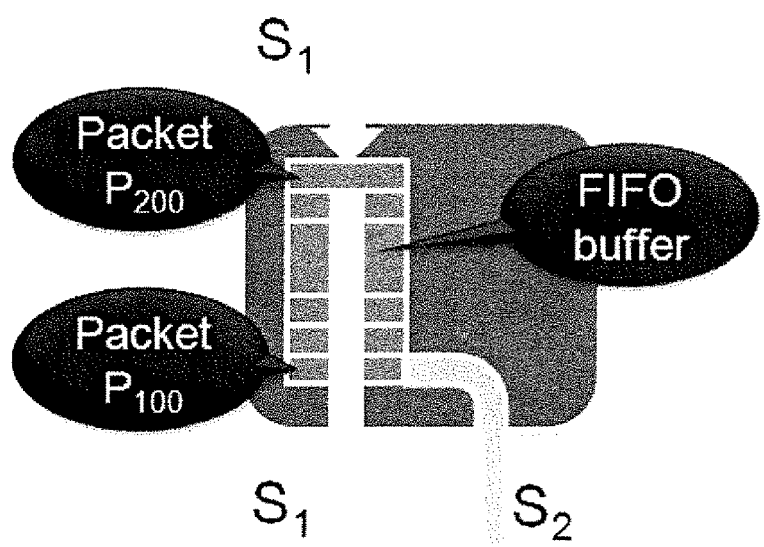
Figure 8:
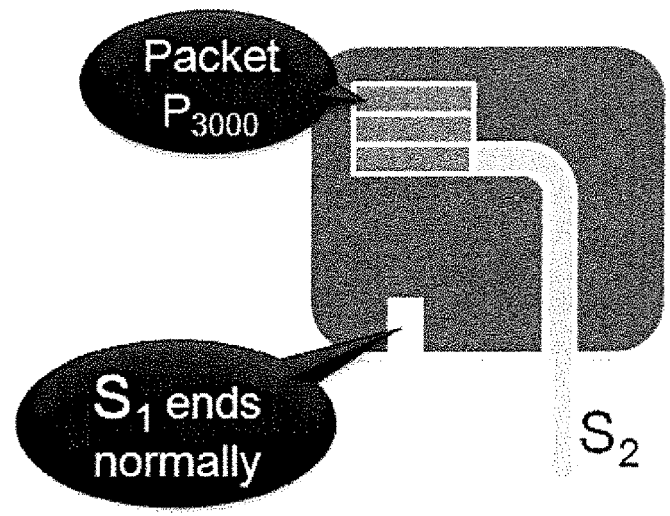
Figure 9:
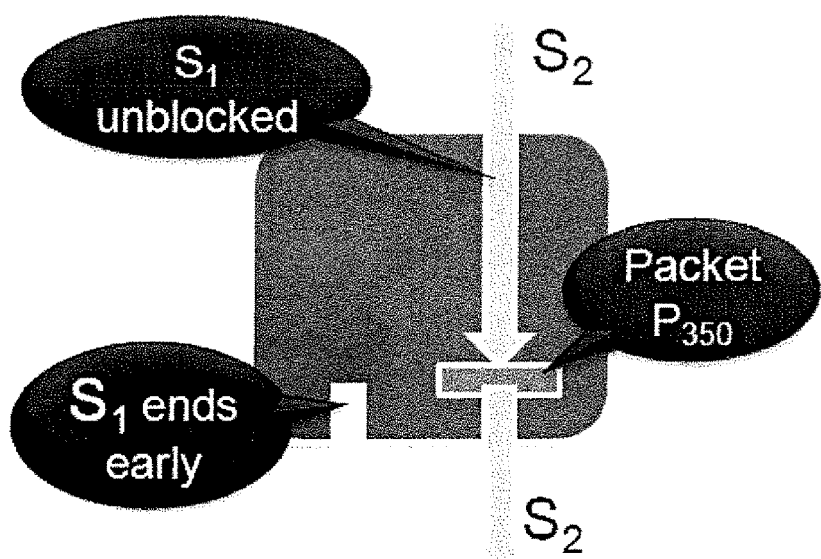

Example merging scenarios will now be described further with respect to FIGS. 4-9. Initially, a stream $S_1$ begins (FIG. 4) with a packet $P_1$ at a given mesh node. At a later time, a second stream $S_2$ begins with packet $P_1$, at which point the first stream $S_1$ is up to packet $P_{100}$. Upon recognition of the overlap based upon the respective content IDs of the first and second streams $S_1$ and $S_2$, the stream $S_1$ is recorded (e.g., in a FIFO buffer) in preparation for the stream merge, as seen in FIG. 6. More particularly, data is stored in the buffer beginning with packet $P_{100}$, and once the second stream $S_2$ catches up to packet $P_{100}$, the second stream $S_2$ is blocked or discontinued and the data packets from the buffer (which were stored from the first data stream $S_2$) are now transmitted in place of the second stream $S_2$ beginning with packet $P_{100}$, as seen in FIG. 7. This occurs until the second stream $S_2$ reaches the last packet from the first stream $S_1$, which will have ended normally (FIG. 8). In an alternative implementation (FIG. 9), when the first stream $S_1$ is terminated or ends early, the second stream $S_2$ may be unblocked and continue from the current location, which in the illustrated example is at packet $P_{350}$.

The above-described approach may therefore be used to implement a video stream tree, in which a video source may be connected to numerous destination, as in a conventional video streaming implementation. However, the above-described smart router approach advantageously reuses data from an older stream for a newer stream, thereby controlling redundancy. Additionally, the merging process may continuously evolve to service new requests and adapt to the dynamics of user mobility. This opportunistic approach may help save precious wireless resources and improve the robustness of the network without requiring cooperation with either the video source or the users.

Figure 10:
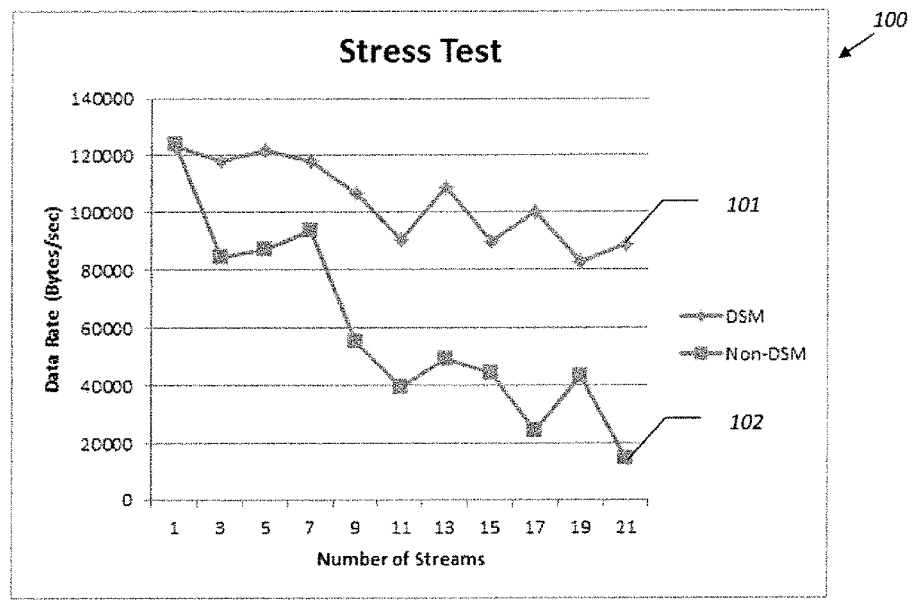
FIG. 10 is a graph comparing data rate vs. number of streams for a conventional routing approach and a routing approach using dynamic stream merging in accordance with an example aspect.

Referring additionally to the graph 100 of FIG. 10, to demonstrate the gains achieved with the DSM approach, an experiment was performed in which a set of nodes in a wireless mesh was made available. A line-mesh topology was used to allow for a maximized number of hops (typically encountered in larger mesh networks). A mesh gateway was connected to a campus network through Ethernet and had NAT (Network Address Translation) service enabled. In the example, there are n+1 users, one of which requests video x, and all of the other users request a different video y at different times. These users are randomly placed among nodes n2, n3, and n4. In the graph 100, two plots 101 and 102 respectively show the data rate for the video x both with and without DSM implemented. As the graph line 102 shows, without DSM the increasing demand for video y makes the lag associated with video x such that video x is essentially unwatchable.

Figure 11:
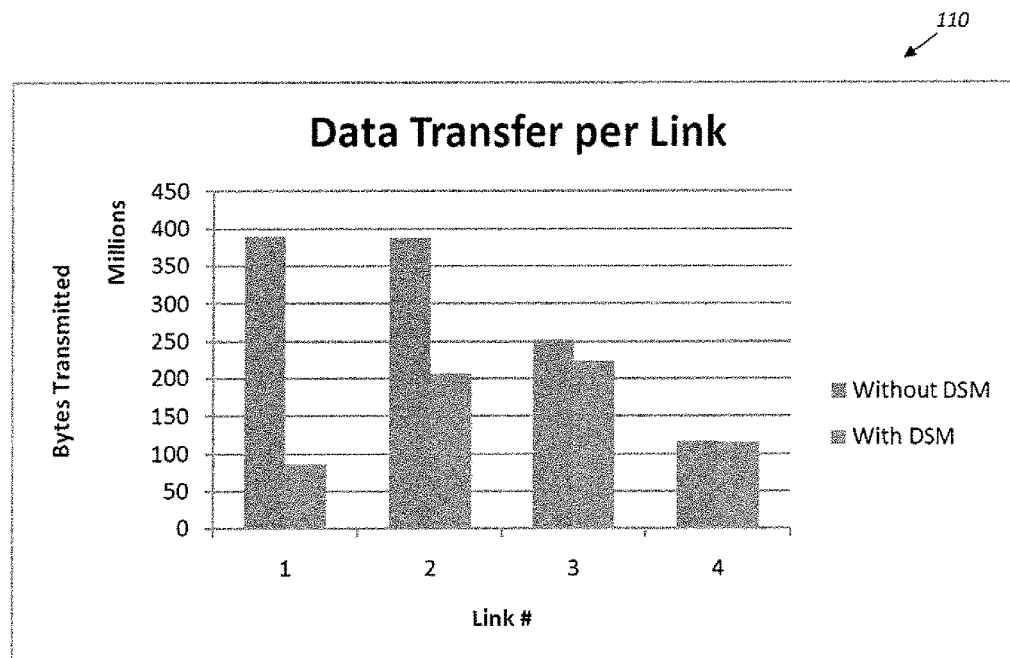
FIG. 11 is a graph comparing bytes transmitted vs. link number for a conventional routing approach and a routing approach using dynamic stream merging in accordance with an example aspect.

In accordance with another experiment pertaining to network stress, which is now described with reference to the graph 110 of FIG. 11, twenty requests for the same video were made. The plots in the graph 110 show accumulated data transmitted at each link in the network. As the plots demonstrate, without DSM there is more traffic, and nearest to the gateway it becomes completely saturated. On the other hand, with DSM, nodes near the gateway are not saturated, and more mesh nodes may be accommodated to support even more traffic.

Reduction in the gateway load enables better network utilization and allows a larger network deployment. As demonstrated above, DSM is much less demanding on the gateway bandwidth, leaving much of the bandwidth for other applications and users. Since DSM does not exhaust the gateway capacity, it allows every mesh node in the network to participate in data forwarding. In other words, users farther away from the gateway may also use the network and experience good performance. In contrast, non-DSM approaches may quickly exhausts the gateway. Heavy congestion renders many packet drops near the gateway. Consequently, mesh nodes farther away from the gateway have little data to forward despite there are a large number of active streams in the network.

From the foregoing results it will be appreciated that DSM is a distributed technique for incremental construction and dynamic maintenance of streaming trees which may incur relatively little overhead, and does not require cooperation with either the video source or the users. Moreover, wireless mesh access network with dynamic stream merging capability may be more robust, more efficient, and more scalable for larger-scale deployment.

Moreover, with respect to typical object (e.g., video) identifiers (e.g., URLs), the same videos residing on different servers would not be recognized as having the same content. However, using the present approach, the same content identifiers may advantageously allow different copies of a given video to be recognized as being duplicates of the same item, and thereby provide more opportunity for traffic de-duplication.

Turning now additionally to FIGS. 12a-12d, further implementation aspects of an example DSM approach are now described. With rapid advances in networking technology, video data has become an inseparable part of many applications nowadays. In particular, video on demand (VoD) is a core technology for important applications such as digital libraries, distance learning, corporate training, public information systems, electronic commerce, and entertainment, just to name a few. A typical VoD service allows remote users to playback any video from a large collection of videos stored on one or more servers. In response to a service request, a video server delivers the video to the user in an isochronous video stream.

Wireless technology has been one of the most transforming and empowering technologies in recent years. By taking advantage of broadband wireless technologies such as 802.11 and WiMax, wireless mesh networks, a special case of mobile ad hoc networks (MANET) with mesh topology, have been used as an edge technology to provide broadband data access in residential, business, and even city-wide networks. In a WMN, the wireless mesh access routers form a mesh-like wireless backbone network that allows end users to access services in the Internet or local area networks through mesh gateways. The users can access a VoD service (e.g., IPTV server or video sharing server) through the wireless mesh backbone. For the sake of convenience, such a network is referred to as a Wireless Mesh Access (WMA) environment. In particular, it may desirable to minimize the traffic in the mesh network for achieving a scalable approach to design a more robust WMA environment.

Using a dedicated server stream for each video service request is very expensive for wireless environments. It also has limited scalability when popular content is demanded by a large number of users. It may also be desirable to have a robust wireless access environment that can sustain sudden spurts in demand for certain videos. When such an event arises, it not desirable for the substantial increase in demand for the related videos to significantly impact the normal access to other regular videos.

To address this issue, one can leverage multicast technology to allow many users to share a popular server stream. As an example in the wired environment, a patching technique allows a new service request to exploit an existing multicast by buffering the on-going stream from the multicast while playing a new "catch-up" flow from the server for the missing portion of the video. Once the catch-up flow, which is called a patching stream, runs out, the playback mechanism switches to play back the multicast data previously cached in the local buffer, i.e., sharing the multicast data. Since patching streams are very short, they are inexpensive and offer a scalable way for clients to share in-progress multicasts. Such techniques, however, cannot be used effectively for a WMA environment because current VoD servers (e.g., video servers of the YouTube website) have no control and cannot support multicast in the WMNs at the edge. The DSM technique may advantageously be used to efficiently support VoD applications in a WMA environment, in which the video server is not directly attached to WMNs (e.g., the video server is on the Internet).

Using DSM to support multicast for VoD in WMNs provides for incrementally forming the multicast groups and adaptively performing routing in the mesh network in a distributed manner without involving the VoD server. When the server receives video requests, it allocates a dedicated stream for each user. However, when a mesh node recognizes that two video streams passing through it have the same video ID, these two streams are merged into a single stream to conserve node resources. Thus, the multicast mechanism is transparent to the VoD server in the Internet. DSM differs from traditional multicast as follows. While the decision of grouping users into a multicast group is made at the server under traditional techniques, DSM dynamically merges ongoing streams in the network without the knowledge of the server. In other words, traditional multicast relies on centralized control logic on the server, whereas DSM is a distributed control technique, and is better positioned to make network-aware protocol decisions.

Although VoD applications are discussed below, it will be appreciated that the DSM technique may be used in other applications as well, such as live broadcast. In this environment, a new user initially receiving a separate video stream from the broadcast source will quickly see this stream merged with another stream in the WMA environment.

To facilitate merging of streams at different play points in their video, we define a video segment as the unit for merging purposes. A segment is larger than the maximum transmission unit of the network. For instance, a segment may be a group of pictures (GOP) or a user-defined chunk in the video. Without loss of generality, we model a video stream as a sequence of non-equal-sized segments, and use sid (segment id) to denote the sequence number of each segment in the stream.

DSM is an in-network stream merging technique. In order to share the data segments among different video sessions (due to stream merging), mesh nodes mesh nodes may be provided with the sid, the stream ID, and the video ID (vid) of each data packet. Moreover, content IDs may be used to recognize duplicate copies of a same video, as noted above. The mesh gateway can encapsulate such information into each data packet. For instance, such identifiers can be determined for RTP (Real-time Transport Protocol) packets as follows. The sequence number field in the RTP header can be adapted for use as the sid. Since the SSRC (Synchronization Source Identifier) field uniquely identifies the source of an RTP stream from an online server, the SSRC can be used in conjunction with the source IP address as the stream ID. Finally, a URL (Uniform Resource Locator) uniquely identifies a video file.

The mesh gateway may maintain a translation table to map the URL of each ongoing video session into a video ID. When a given video is no longer in use in the network, its current video ID is no longer needed, and can be recycled and used for another video in the future. With the aforementioned information in the header of each network packet, DSM is able to identify the ongoing streams and their segments in the network layer, and handle the packets based on the information.

Figure 12A:
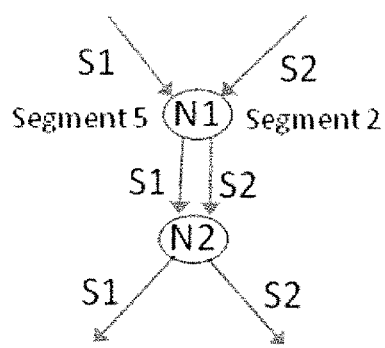
FIGS. 12a-12d are a series of schematic block diagrams illustrating further dynamic stream merging techniques which may be used in example embodiments.
Figure 12B:
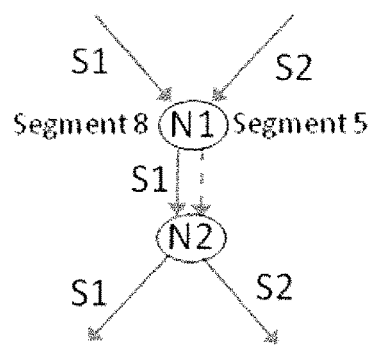

A simple 2-stream merging scenario is illustrated in FIGS. 12a-12d. Streams S1 and S2 are two data streams of the same video passing through node N1. Merging occurs in two stages as illustrated in FIGS. 12a and 12b, respectively. In this example, the node N1 currently receives segment 5 on stream S1 (i.e., the highest sid of the packets read from S1 is 5) and segment 2 on stream S2. In stage 1 (FIG. 12a), the node N1 notices these two video streams have the same video ID, and informs the node N2 of the intention to merge these two streams. That is, the data packets arriving on stream S1 for node N2 are actually "multicast" packets for both streams S1 and S2 in the downstream as illustrated in FIG. 12b. In response, node N2 begins to save the packets arriving on stream S1 in a local FIFO buffer, starting with the packets with sid equal to 5. In stage 2 (FIG. 12b), after node N1 forwards the packets of segments 2, 3, and 4 on stream S2, it stops forwarding packets for stream S2 despite the data continuing to arrive (i.e., stream S2 is blocked by node N1). At the same time, node N2 continues to forward data on stream S1 as before while it also appends the arriving video segments to the back of the FIFO buffer. As this buffer is being fed with data from stream S1, node N2 also retrieves packets from the front of this FIFO buffer, starting with the packet of segment 5, and forwards them on S2 to the downstream.

Figure 12C:
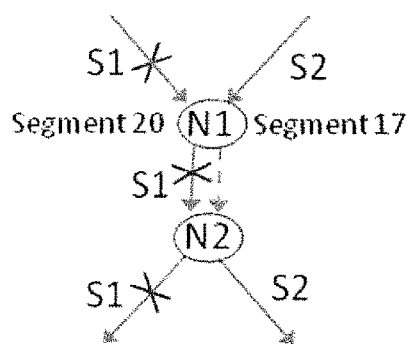
Figure 12D:
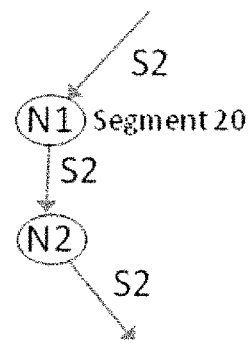

In the above example, if stream S1 is terminated by its client (FIG. 12c) or the route of stream S1 is diverted from node N1 by the unicast routing protocol, the client of stream S2 would no longer be able to receive its data from node N1. By way of example, this scenario may occur when node N1 attempts to receive segment 20 on stream S1 as illustrated in FIG. 12c. Since node N1, at this moment, has segments 17, 18, and 19 already in its buffer, node N1 may continue to forward these segments on stream S2 to the downstream. When this FIFO buffer is exhausted, node N1 may resume the data forwarding for packets arriving on stream S2 starting at segment 20 (i.e., normal forwarding is resumed) as shown in FIG. 12d. We note that the client of stream S2 still gets all the video segments and are not affected by the changes at node N1. Similarly, if stream S2 is stopped at node N1, node N1 can simply cancel the merging by informing node N2 that the packet from stream S1 is no longer a "multicast packet" also for stream S2 in the downstream.

Stream merging is relatively resilient to the dynamics of the network. As seen in the above example, both the merging and the cancellation involve only two nodes (and in some embodiments this may be performed by a single node). In general, multiple streams may be merged locally to share the wireless bandwidth. Furthermore, the same procedure may run autonomously at each mesh router in parallel, and the streams will be merged in the entire network through the distributed control logic to form a "multicast" tree.

Using two nodes for stream merging may have certain advantages. When two streams passing through two consecutive nodes, the merge is performed at the bottom node and therefore save one stream between the two nodes. The "younger" of the two streams continues to arrive at the top node after the merge. The top node just would not relay this younger stream to the bottom node. The reason for having this stream continue to arrive at the top node is to allow quick resumption of the relay of this younger stream to the bottom node should the older stream (the younger stream is relaying on in the bottom node) terminates prematurely (i.e., the viewer decides to stop the video before the end of the video.). This rapid resumption of a relay is to avoid jitter in the video playback at the destination. This input is also relevant to the unblocking discussed above.

A Merge Tree (M-tree) may be used to support stream merging at each mesh node. Given a data transmission between two mesh nodes, we refer to the sender of this transmission as the upstream node (UN) and the receiver as the downstream node (DN). Each mesh node uses an incoming M-tree (iM-tree) and an outgoing M-tree (oM-tree) to record information about each incoming stream and each outgoing steam, respectively. The root node of an M-tree represents the actual stream being received or transmitted. A node is called the merger of its children in the M-tree. The child nodes are referred to as the mergees of the parent node. The tree structure informs the mesh node that the streams corresponding to the mergees have been merged with the stream corresponding to the merger, i.e., the merger stream "acquires" the mergee streams. Consequently, these mergee streams need to reuse the video data from the merger stream. That is, they share a "multicast" stream.

Figure 13A:
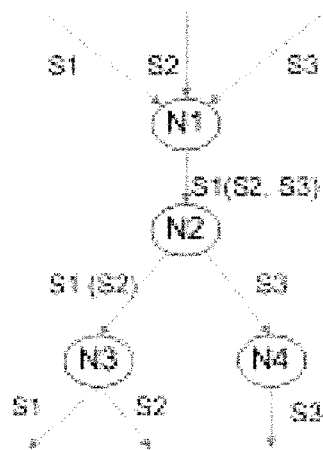
FIG. 13a is a schematic block diagram illustrating a multi-stream dynamic stream merging scenario in accordance with an example aspect.
Figure 13B:
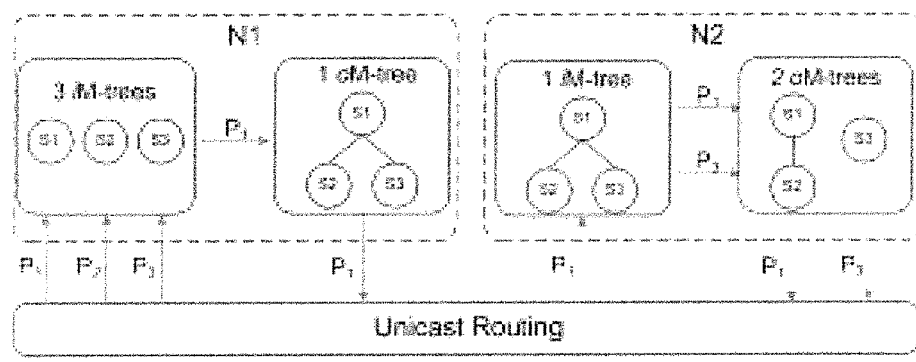
FIG. 13b is a schematic block diagram illustrating an example packet forwarding approach for dynamic stream routing in accordance with an example aspect using a merge tree.

Data forwarding at each mesh node may be performed according to its oM-trees as follows. Only the streams indicated in the root nodes of the oM-trees need to be forwarded. An example is illustrated in FIGS. 13a and 13b. As shown in FIG. 13a, node N1 has three incoming streams S1, S2 and S3 from three different upstream nodes. These three streams share the same next hop, node N2. After passing through node N2, streams S1 and S2 go to node N3 and stream S3 goes to node N4. In this scenario, the three video streams are merged at the link between nodes N1 and N2. Streams S1 and S2 continue to be merged at the link between nodes N2 and N3, while stream S3 is diverted to node N4.

These activities are accomplished with the help of the M-trees as follows. As illustrated in FIG. 13b, both nodes N1 and N2 may have the DSM software running on a processor atop a certain unicast routing protocol. Pi (i=1, 2, 3) denotes the packets of the video segment being forwarded for stream Si (i=1, 2, 3). The three iM-trees in node N1 indicate that it has three incoming streams. However, node N1 has only one oM-tree and it needs to forward data only for stream S1 as indicated in the root note of this oM-tree. The iM-tree of node N2 is the same as the oM-tree of node N1 in this case. This allows node N2 to interpret the incoming stream as a multicast stream for merger stream S1 as well as its merges, streams S2 and S3. Since there are two oM-trees at node N2, it needs to forward data for the two streams S1 and S3 indicated in the roots of these two oM-trees. Packet P1 is forwarded on stream S1. The oM-tree indicates that this packet is also intended for the mergee stream S2. Node N2 also forwards a copy of this packet P3 on stream S3. We do not show packet P2 as an outgoing packet in FIG. 13b to make the distinction between a packet for an actual merger stream (e.g., stream S1) and the same packet reused for a mergee stream (e.g., stream S2).

An example buffer management technique and the admission control for DSM will now be described with reference to FIGS. 14a-14d. Let "chunk" be the memory unit for buffer management. A memory chunk has the average size of video segments. Without loss of generality, the case of merging two video streams S1 and S2 is assumed, with a playback distance of d video segments. That is, after the video server sent out d video segments for stream S1, it started to transmit data for stream S2. To merge stream S2 with stream S1 at a mesh node N1, node N1 needs to maintain a FIFO buffer with a capacity of d chunks in order to retain the video segments arriving on stream S1 for transmission to the downstream node on stream S2 sometime later.

Figure 14A:
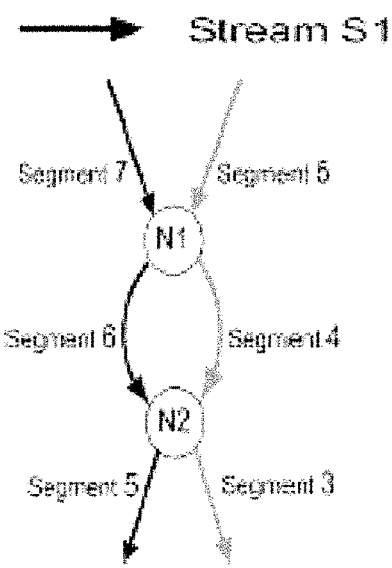
FIGS. 14a-14d are a series of schematic block drawings illustrating an example buffer management aspect for dynamic stream management.
Figure 14B:
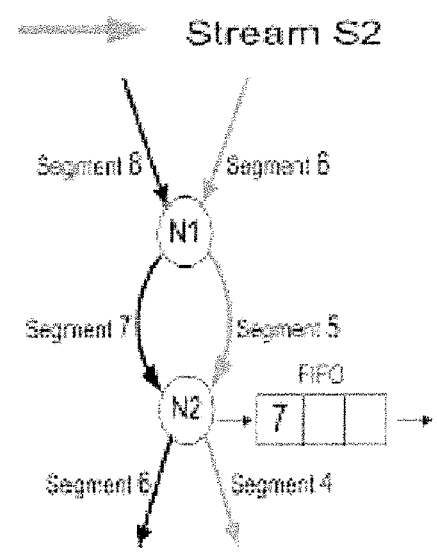
Figure 14C:
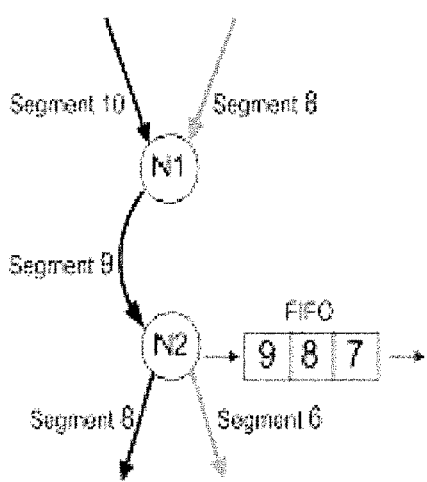
Figure 14D:
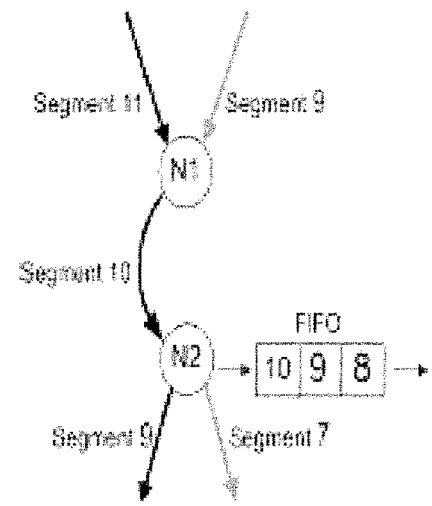

In the illustrated example, the arrows on the left hand side of the nodes N1, N2 represent stream S1, and the arrows to the right depict stream S2. The initial state of this example is shown in FIG. 14a. Here, two streams with a playback distance of 3 video segments are passing through node N2. To merge these two streams, node N2 dynamically allocates a FIFO buffer with a capacity of three chunks, as seen in FIG. 14b. In this figure, node N2 continues to receive and forward the video segments for streams S1 and S2. However, node N2 also saves the incoming segment 7 arriving on stream S1 to the FIFO buffer. The final step of this merging process is illustrated in FIG. 14c, when the FIFO is full. From this time on, node N2 may forward video segments to stream S2 in the downstream, using data from the FIFO buffer. In the illustrated embodiment, a dedicated buffer is used for each mergee stream, although other techniques may be used to allow multiple mergees of a merger to share a buffer.

In the above example, node N2 might not currently have enough buffer space to accommodate the merge request. A simple first-come-first-serve admission control strategy may be employed to handle this condition. When node N1 initiates a merge request with node N2, if node N2 does not have enough buffer space to accommodate the merge process, the request is declined and node N1 has to wait for the merge notification from node N2 to try again when more buffer space becomes available. To support this strategy, node N2 maintains a waiting area for the pending requests. When more buffer space becomes available, node N2 utilizes a "best fit" policy to accommodate the most number of pending requests possible using the available buffer space.

DSM may be implemented either as a non-transitory computer readable medium software module on top of the unicast routing protocol or as a non-transitory computer readable medium extension (e.g., a software patch) of the unicast routing protocol in WMNs. DSM may obtain from the routing layer is the ID of the next hop node for each video stream. This information may be provided by most unicast routing protocols used in WMNs, whether they maintain complete routes in the mesh network or forward the packets in a hop-by-hop manner.

TABLE I

Fields in Session Table

| | |
|---|---|
| vid | video id |
| src | source IP address and port number |
| dest | destination IP address and port number |
| cur_sid | current highest segment id observed by the mesh node |
| blocked_sid | the video stream is blocked after forwarding this segment |
| status | status of this session |
| next_hop | address of the node in the next hop of the stream |
| merge_hop | the next_hop value when the merge occurs |
| merger | the merger of this session |
| mergeelist | list of mergees of this session |

In DSM, each node in WMNs may monitor the video streams currently passing through the node, and maintain a session table with an entry for each of these streams. Table I above lists certain fields which may be in the session table. Specifically, in the mesh DSM each node in WMNs may monitor the video streams currently passing through the node, and maintain a session table with an entry for each of these streams. The mesh node may store the highest sid received for each stream in the cur_sid field. Two fields, merger and mergeelist, may be used to implement the M-tree concept as follows. For each stream S recorded in the session table, the merger field records the merger of S (which can be S itself if S is not currently merged by any stream at any outgoing link of this node), and the mergeelist field includes the list of mergees of S (which may be empty if S does not currently merge any stream at any incoming link of this node). For example, let us consider node N2 in FIGS. 13a and 13b. The merger field and mergeelist field for stream S1 are streams S1 and {S2, S3}, respectively. Similarly, the merger field and mergeelist field for stream S2 are stream S1 and an empty list, respectively. In general, an M-tree may have more than just two levels. However, only the root node corresponds to an actual stream being received or transmitted. Other fields in the session table are explained below.

Two operations, namely the Merge Operation and the Cancel Operation, may be used to facilitate dynamic merging and splitting of streams in WMN's. The Merge Operation merges two streams at the communication link between a UN and a DN. The UN and the DN cooperate with each other to update the affected M-trees by updating their own session table. Given two streams being merged, the stream with a lower cur_sid may be chosen as the merge, and the other stream is the merger. Let the merger be X and the mergee be Y. Merging streams X and Y requires a handshake between the UN and the DN as follows. The UN sends a Merge Request message to the DN. This message contains information about the merger X and the mergee Y.

Two scenarios may result. In the first scenario, if the merging request is admitted by the DN, it adds Y to X's mergeelist in the session table. The DN then returns a Merge ACK message to the UN. After receiving the Merge ACK message, UN sets the merger field of stream Y to X in the session table. The UN also records the address of the DN in Y's merge_hop field. This field is used in the Cancel Operation. On the other hand, in the second scenario, if the merging request cannot be admitted, the DN sends a Merge NACK message to the UN. After receiving the NACK, the UN will not attempt to merge these two streams again until it receives a notification from the DN.

When the Merge Operation succeeds, the two oM-trees, rooted at the merger X and mergee Y, respectively, are merged at the UN. Similarly, the two iM-trees, rooted at streams X and Y, respectively, are merged at the DN. The purpose for the Cancel Operation is to break the merge between the merger, say stream X, and mergee, say stream Y, built by a previous Merge Operation. In this situation, streams X and Y are found in the same M-trees. Furthermore, stream Y corresponds to the root of a subtree which is fully contained in another subtree rooted at the node corresponding to stream X.

The Cancel Operation is to detach the subtree rooted at stream Y from the affected M-tree. Similar to the Merge Operation, the Cancel Operation may include a handshake between the UN and the DN to ensure that both mesh nodes get its session table updated. The UN may identify the DN of the mergee Y prior to the Merge Operation by looking up the merge_hop field of stream Y in the session table. The UN then sends a Cancel Request message to this DN. This request contains information about the merger and mergee involved in the cancellation. When receiving the Cancel Request message, the DN removes the mergee Y from the merger X's mergeelist and sends back a Cancel ACK message to the UN to confirm the cancellation. The UN then sets the merger field of stream Y to itself. When the Cancel Operation succeeds, the sub-trees rooted at stream Y is detached from the iM-tree and oM-tree that contain stream X and becomes a new iM-tree and a new oM-tree, respectively.

The status field in the session table may be used to indicate the status of a stream. By way of example, there may be four statuses in DSM, namely NM (normal mode), BM ("before merging" mode), TM (termination mode), and SD (stream dead mode). The NM status indicates a normal stream. In accordance with one example, only streams in NM mode are considered in a Merge Operation. The BM status indicates that a mergee stream is amid a Merge Operation (i.e., the Merge Request has not been acknowledged by the DN). The status of a mergee stream transits from BM mode to TM mode when the UN finally receives the Merge ACK from the DN indicating the success of the merge operation. If the Merge Operation fails, the mergee stream returns to NM mode. Last but not least, a stream in NM, BM or TM mode goes into SD mode if the stream becomes idle. DSM may recognize an idle stream if there is no incoming packet arriving on this stream for a certain time period. This may be a result of various wireless conditions such as link failure, interference, or network congestion in the vicinity. When the status of a stream changes into SD, a Cancel Operation is invoked since merging an idle stream is not necessary. The SD status only transits to the NM state when normal data forwarding resumes for the given stream.

Figure 15:
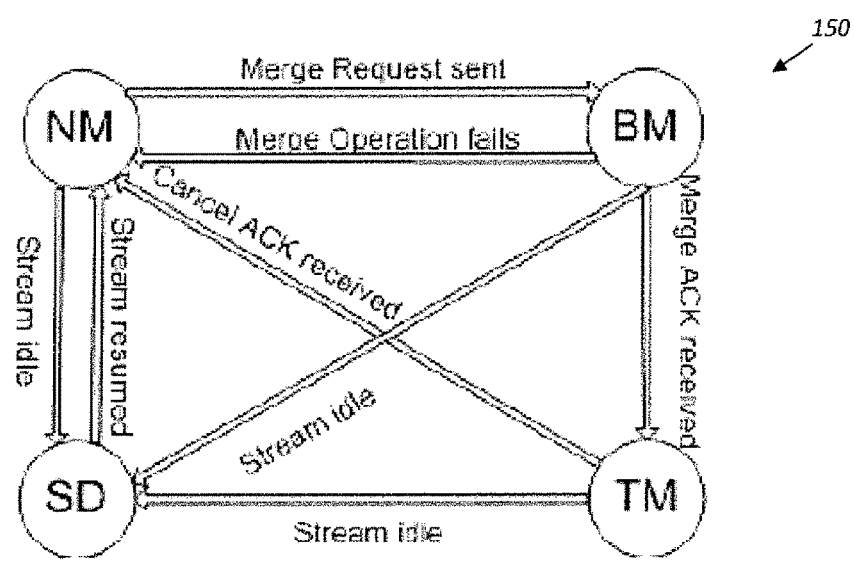
FIG. 15 is a status transition graph for an example dynamic stream merge approach in accordance with an example aspect.

An example status transition graph 150 is shown in FIG. 15. Each mesh node periodically checks the session table and triggers the Merge Operation and Cancel Operation in accordance with the values in the status field. In accordance with an example embodiment, only streams in NM status may be candidates for the Merge Operation. For streams with the same vid, the pair of streams with the smallest difference in their cur_sid values may trigger the Merge Operation. After the merge, the merger stays in NM mode and the status of the mergee is changed into BM. This process may be repeated until no more streams in NM mode are found in the session table. This procedure may help ensure that a stream may have multiple mergees but only one merger.

Each mesh node may also periodically update the next_hop field in the session table based on the routing information provided by the unicast routing protocol. The next hop of the stream is subject to change due to the dynamics of the underlying networks, e.g., link failure or route change. If the next_hop fields of the merger and mergee are different or any of the next_hop fields becomes invalid, a Cancel Operation may be triggered to cancel the affected merging. In performing the Merge Operation and Cancel Operation, the UN and DN may to exchange messages. Messages of multiple operations may be batched in one control packet to reduce communication overhead.

A recursive function may be used to implement the data forwarding scheme discussed previously. When an incoming packet p arrives at the mesh node, the mesh node finds its corresponding stream s based on the information in the packet header. This packet and its stream s are used as the input to the forwarding function presented in Table II, below. The input level is initialized to 1 for this function call.

TABLE II

RECURSIVE FORWARD FUNCTION

Recursive_Forward (p, s, level)
1. FOR each stream k in s.mergeelist DO
2.   make a copy of p as p_copy for k.
3.   Recursive_Forward(p_copy, k, level+1)
4. IF (s.status == TM && p.sid >= s.blocked_sid)
5.   delete p
6. ELSE IF ( level > 1) // it is a copied packet
7.   enqueue p into the FIFO buffer for s
8. ELSE
9.   forward p For each stream k in the mergee_list of s, the function may make a copy of p (p_copy) and spoof certain fields such as IP addresses and port numbers in the header of p_copy to make it a packet for stream k. At line 3, this function is recursively called to process p_copy for stream k. The input level is increased by one to indicate the input packet is a copied packet, not a packet from the last hop. This recursive scheme helps to ensure that all the streams in the M-tree of s will be processed by this function with their own packets. Starting at line 4, the function makes the forwarding decisions for stream s. If stream s is in TM mode, the packet whose sid is beyond the blocked_sid of s is deleted. If stream s is not in TM mode, the function verifies the level, at line 6, to see if the input packet is a copied packet. If p is a copied packet, it is stored into the FIFO buffer for s and will be forwarded later (line 7). Otherwise, p is a packet arriving from the last hop and the function forwards this packet right away (line 9).

In accordance with another example approach, the above-described techniques may be used to provide a traffic deduplication technique to achieve more efficient network communication between video sources (video servers or proxy servers in a CDN) and clients. The proposed SMART (Small packet Merge-Able RouTers) overlay network employs an opportunistic traffic deduplication approach and allows each SMART router to dynamically merge independent streams of the same video content, forming a video streaming tree (VST). The merged streams are tunneled through the overlay together with TCP sessions information before eventually being de-multiplexed and delivered to the clients fully compatible with the TCP protocol.

We examine the implementation of a SMART overlay working in conjunction with the current overlay multicast approach but providing an improved service to the clients and applications. Multicast networks are an important form of communication especially for VOD, video conferencing and peer-to-peer file sharing. This allows the applications to use resources more efficiently and greatly enhance scalability. Currently, there is limited network layer support for multicast and this has led to applications turning to higher levels in the Internet to obtain services. In response, overlay multicast networks were developed and are currently used in the Internet. The overlay multicast nodes communicate with each other and hosts using standard unicast mechanisms. Overlay networks provide higher end services to the clients or applications while abstracting data from the underlying Internet.

The SMART routers could be installed at core networks as well as between CDN and clients in order to create an overlay topology that will incrementally merge redundant video streams and form a video streaming tree (VST) to the clients. This may help fill gaps that the aforementioned techniques currently do not address. The VST constructed throughout our SMART overlay topology is not the same as a multicast tree. The two main differences between the techniques are the following:

1) The VST constructed allows for more traffic compared to the multicast tree when handling duplicate VOD requests; and
2) The multicast tree limits the clients by the multicast wait time for a video. In contrast the VST does not need to batch wait before sending the video to the clients.

In current multicast overlay architectures, video streams can become a bottleneck, such as from the video server or CDN. In addition, there is more traffic passing through the rest of the network links. The SMART overlay topology in conjunction with the multicast overlay will help alleviate resource bottlenecks leading up to the video source and help decrease bandwidth requirements throughout the rest of the networks until reaching the end node. The VST formed in the overlay topology directly addresses the need for a deduplication technique in the Internet.

The routers with the software installed, called SMART routers, will still behave as usual until a video is detected. The software controller will identify videos traversing through the network and determine if the video is new, existing and/or existing and currently in the merge process. To determine if it is a video the software parses the Content-Type field of the HTTP header of the packet. If the top-level media type is a video then the controller assigns a video id for this particular video identified. Otherwise, the software will treat the packet as non-video and forward on to the next hop as usual. A video id is a unique identifier stored in the merge table for handling lookup of duplicate videos. Next, the controller will extract host and destination fields from the packet and also store them in the merge table. The merge table is used as a lookup table to help maintain the state of the router and keep track of the various merge processes occurring in the router. The controller part of the software also helps forward the packets to neighboring SMART routers in the overlay topology. If there is a match in the video ID, the software will then hand off the abstraction of the identified video packets to the redundancy control merging algorithm to handle the merge process.

The redundancy control merging (RCM) algorithm in the SMART software handles the redundant videos that pass through these routers. The RCM helps form the video streaming tree. The merging of the video streams takes place in the internal router fabric of the SMART routers.

The typical internet architecture at the routing level comprises of core routers, aggregation routers and edge routers listed in the descending order of routing capacity. Traffic congestion in the internet is handled by maintaining the hardware queues in the router buffer. In an example embodiment, external or proxy buffers are not used, and instead the internal router fabric available in these routers is used. This may help reduce latency and implement a redundancy control buffer component in the overlay.

The RCM creates multiple mini buffer buckets in the router to handle the merging of various duplicate videos. In order to help conserve the limited buffer resource size on the routers, the merge process does not start the buffer process immediately when a video is identified. The RCM will only create the mini buffer bucket once a second redundant video is identified. The total buffer space used is the sum of the mini buckets created for each of the redundant videos. To better understand the merge process in a SMART router, the SMART software will perform the following basic steps after encountering the first video stream:

1) Once a video stream is identified as an original video by the controller, the software initializes a parent stream (P1) for this particular video stream.
2) When the next video stream is received, the controller checks for redundancy. If the video is redundant, the stream will become the first child stream, C1, and proceed to the next step. Otherwise, the software initializes another parent stream.
   a) For a redundant stream, the SMART software records the packet byte (pointer) number where the redundant video (child) started at with respect to the parent stream packet. The record is stored in the merge table and each child stream is given its own unique pointer.
   b) The difference between the two byte numbers (P1 and C1) gives us the temporal capacity. The temporal capacity is used to determine the size of the first buffer bucket that will be used to merge the corresponding child streams. The buffer will also be used to send information to the respective client.
3) Next, the RCM allocates space in its router buffer using the temporal capacity recorded and produces a mini buffer bucket to begin storing part of the parent stream. In the FIG. 2 example, the caching begins at the $50^{th}$ packet because P1 was at this point when C1 arrived.
4) Once the child stream, C1, catches up to the starting packet in the buffer, the merging between the two streams begins to take place. Next, the router will alert the upstream node that the merge has occurred and that it is now possible to block C1.
5) The playback may continue on until C1 has been entirely sent to the client.
6) The process repeats for each additional video stream received such as C2 in FIG. 2.
   a) If P1 gets abruptly cut off, the first child stream C1 will then be unmerged from the parent stream by sending a resume request to the server. Once the remaining packets (from the buffer) in the parent stream have been exhausted, the video stream will then resume from the video server again. C1 will also become the new parent stream for C2.
   b) If C2 arrived too late to join the P1 stream, it will become the next parent stream for this video (if needed).

A portion or the entire video can be buffered in a SMART router but the router does not store the video cache for very long. The buffer bucket is freed after all requests have finished processing for a particular video. This activity additionally allows us to maximize the limited buffer space on the routers in order to handle more video merging requests. Finally, the entire buffer resource available on a router does not go to the merge process. The SMART software keeps a reserved buffer size partition available for regular streaming.

In an example embodiment, the optimal merging location is where the maximum amount of bandwidth savings can be achieved for the network links between the client and server. In the constructed VST, the proposed stream merging strategy is running distributively on every SMART router. Thus if the routing paths of two video streams starting from the same video source, pass through multiple SMART routers together before they split to go to two clients, each of these SMART routers could conduct the stream merging operation by itself independently. The final merging location could be any one of those SMART routers.

However from the perspective of saving network traffic, the optimal merging location should be the last SMART router where these two streams go through together right before they split (as illustrated in the merging result topology in FIG. 1). The following analysis shows that the proposed distributed stream merging strategy will achieve stream merging at the optimal location when multiple SMART routers are involved.

Without loss of generality, suppose two streams (S1 and S2) that can be merged together are passing through the same two SMART routers (R1 and R2) before they split, as shown in the following FIG. 3. The optimal location for the merging means: If both R1 and R2 have resources, the merging should be on the last SMART router that these two streams go through together, i.e., on router R2; if R2 does not have any resources for merging, then the merging should happen on the next SMART router going up the common routing path towards the video source, i.e., on router R1. Notice that these two SMART routers conduct stream merging independently.

An example approach to determining how the optimal merging location can be achieved is now discussed. Suppose that the second stream S2 will be merged to the first stream S1 without loss of generality. For the first scenario, where both R1 and R2 have resources for merging and conduct merging independently, there are two possible merging results. If router R1 starts merging first, the packets of S2 between the Server and R1 will be discarded. Note at this moment R2 is not merging S2 yet. When router R2 begins merging later, it will discard packets of S2 received from R1 and inform R1 to stop its merging activity (i.e., drop all packets of S2 and simply forward packets of S1).

If router R2 starts merging first, the traffic link of S2 between R2 and R1 will be removed, which will result in router R1 discarding its ongoing merging activity on S2 since the stream S2 does not exist anymore from the perspective of R1.

For both cases, in the end the merging will be held on router R2, the last SMART router to both clients and is the optimal location.

For the second scenario when R2 does not have any resources for merging, R1 starts merging and will keep holding this merging, which is the optimal merging location for this scenario.

Additionally, it should be pointed out that the distributed merging algorithm can also handle dynamics in internet routing. Packets can traverse from the server to clients through different paths and as long as there are a pair of SMART routers on a path, the algorithm can reduce duplicated packets.

In summary, the proposed distributed merging strategy eventually achieves stream merging at the optimal location, and there is no waste of buffering resources on other SMART routers.

The SMART overlay merges multiple TCP sessions into one stream to save bandwidth. One challenge is how to make it transparent to the clients' applications (i.e., for each clients' application, it is still dealing with the video server). The SMART tunneling technique is designed to address this problem.

To get a better understanding of the tunneling approach, consider a video source, SMART routers (overlay) and clients (C1-C6). To simplify we can say Routers A and C are core routers and Routers B, D and E are edge routers. Suppose A is merging video streams for C1-C6. Router A would store the packets and their destinations in the merge table. For each packet in the merge table for Router A, two things need to be done. First, it consults the routing table to figure out what next hops are needed to forward the packet. In this scenario, A needs to send the packet only once to B since the TCP sessions for C1 and C2 are merged. The same would be true for A to C. Second, A encapsulates the TCP packet in an IP datagram. The IP's header source is set to Router A's IP address. The destination address is set to IP address of the next hop (B or C). The payload of the IP datagram is a UDP packet. The UDP packet has the tunneling header and the payload containing the TCP packet. The tunneling header includes the following three parts: type, video id and destination list.

The video id identifies the particular video that is being merged in the router. The type field in the IP header identifies whether the packet is being forwarded to the next hop or should be handled as a tunneling packet (and subject to the merge process). The type field option would be set to forward in a packet retransmission scenario. The last part is a destination list of tuples (destination IP, port). In this case, it would be information about C1 and C2 for packets A to B and C3-C6 for A to C. The IP datagram encapsulation using a UDP payload allows the SMART routers to identify the packet as a tunneling packet. When Router B (Edge) receives the packet, it realizes it is servicing C1 and C2. The SMART software will then fabricate a packet for C1 and C2 (with the appropriate TCP header and payload) and transmit the packets to C1 and C2 respectively. When C receives the packet (and is a core router), if it is not merging the video, it checks for the UDP header. If it is a tunneling packet the router will extract the destinations and figure out the next hops. In our example, C would send a packet to Router D with C3 and a packet to Router E with C4-C6.

Now suppose some packets are lost for C1. The video server would retransmit these packets and the packets would come through Router A again. It should tunnel these packets to C1 and set the type field to forward in the tunneling packet header. All the subsequent SMART nodes will simply forward the packets. We also need to handle TCP sessions for disconnection and timeout. Each SMART router monitors incoming traffic for all the clients it is servicing. If the client activity is dormant for a period of time, the routers will stop forwarding the traffic to that client. If there was a timeout or congestion, the video server will resume sending packets and our routers will resume too.

Finally, to reduce the potential congestion between the SMART router (Edge) and clients, we will initiate a patching technique. Suppose C1 arrives to the SMART router first and shortly after C2 arrives. The stream for C1 becomes the parent stream when Router A starts merging for both C1 and C2. Suppose merging begins at packet 100. Router B will receive buffered packets for C2 starting from 100 along with packets 1 to 99. In this case, B will buffer the packets and only deliver the pre-buffered packets 1 to 99 ("patching") to C2. After that, B will deliver the buffered packets starting from 100 to C2. The methodology described guarantees the SMART overlay does not overburden the so called "last mile" between the edge routers and clients.

Many modifications and other embodiments of the invention will come to the mind of one skilled in the art having the benefit of the teachings presented herein. Therefore, it is understood that the invention is not to be limited to the specific exemplary embodiments disclosed herein.

That which is claimed is:

1. A computing device comprising:
a memory and a processor cooperating therewith to
receive a plurality of data streams from at least one data source to be relayed to different destinations on demand, each data stream having a respective content identifier associated therewith uniquely identifying a data file in the data stream, the data file potentially sourced from a plurality of content providers,
determine when a first one of the data streams for a first destination shares identical data with a second one of the data streams for a second destination based upon the respective content identifiers associated therewith,
suspend relaying the second data stream to the second destination, and begin relaying the first data stream to the second destination, based upon the determination that the first and second data streams share identical data based upon the respective content identifiers associated therewith, and
when the first and second data streams share identical data and when the first data stream starts earlier than the second data stream, record the first data stream from a current playback point until the second data stream reaches the current playback point.

2. The computing device of claim 1 wherein said processor cooperates with said memory to:
store the first data stream in said memory; and
begin relaying the first data stream from said memory to the second destination from a location in the second data stream where relaying was suspended.

3. The computing device of claim 2 wherein said memory comprises a first-in, first-out (FIFO) memory.

4. The computing device of claim 1 wherein the first and second data streams comprise video data streams.

5. The computing device of claim 1 wherein the first and second data streams each has a respective downstream node identifier associated therewith; and wherein said processor further determines when the first and second data streams have matching downstream node identifiers, and begins relaying the first data stream from said memory to the second destination further based upon the matching downstream node identifiers.

6. The computing device of claim 1 wherein said processor is further configured to:
   determine when relaying of the first data stream to the first destination is terminated; and
   discontinue relaying the first data stream to the second destination and resuming relaying the second data stream to the second destination based upon determining that relaying of the first data stream has been terminated.

7. The computing device of claim 1 wherein the content identifiers are encoded in respective data streams.

8. A computing network comprising:
   a plurality of computing devices configured to relay a plurality of data streams from at least one data source to a plurality different destinations on demand, each data stream having a respective content identifier associated therewith uniquely identifying a data file in the data stream, the data file potentially sourced from a plurality of content providers;
   wherein at least one of the plurality of computing devices comprises a memory and a processor cooperating therewith to
      determine when a first one of the data streams for a first destination shares identical data with a second one of the data streams for a second destination based upon the respective content identifiers associated therewith, and
      suspend relaying the second data stream to the second destination, and begin relaying the first data stream to the second destination, based upon the determination that the first and second data streams share identical data based upon the respective content identifiers associated therewith, and
      when the first and second data streams share identical data and when the first data stream starts earlier than the second data stream, record the first data stream from a current playback point until the second data stream reaches the current playback point.

9. The computing network of claim 8 wherein said processor cooperates with said memory to:
   store the first data stream in said memory; and
   begin relaying the first data stream from said memory to the second destination from a location in the second data stream where relaying was suspended.

10. The computing network of claim 8 wherein the first and second data streams comprise video data streams.

11. The computing network of claim 9 wherein said processor is further configured to:
    determine when relaying of the first data stream to the first destination is terminated; and
    discontinue relaying the first data stream to the second destination and resuming relaying the second data stream to the second destination based upon determining that relaying of the first data stream has been terminated.

12. The computing network of claim 8 wherein the content identifiers are encoded in respective data streams.

13. A method for relaying a plurality of data streams from at least one data source to a plurality different destinations on demand via a computing network comprising a plurality of computing devices, each data stream having a respective content identifier associated therewith uniquely identifying a data file in the data stream, the data file potentially sourced from a plurality of content providers, the method comprising:
    at a given computing device within the computing network,
       determining when a first one of the data streams for a first destination shares identical data with a second one of the data streams for a second destination based upon the respective content identifiers associated therewith,
       suspending relaying the second data stream to the second destination, and begin relaying the first data stream to the second destination, based upon the determination that the first and second data streams share identical data based upon the respective content identifiers associated therewith, and
       when the first and second data streams share identical data and when the first data stream starts earlier than the second data stream, recording the first data stream from a current playback point until the second data stream reaches the current playback point.

14. The method of claim 13 further comprising, at the given computing device:
    storing the first data stream in a t-he memory; and
    beginning relaying the first data stream from the memory to the second destination from a location in the second data stream where relaying was suspended.

15. The method of claim 13 wherein the first and second data streams comprise video data streams.

16. The method of claim 13 further comprising, at the given computing device:
    determining when relaying of the first data stream to the first destination is terminated; and
    discontinuing relaying the first data stream to the second destination and resuming relaying the second data stream to the second destination based upon determining that relaying of the first data stream has been terminated.

17. The method of claim 13 wherein the content identifiers are encoded in respective data streams.

* * * * *